United States Patent
Zhu et al.

(10) Patent No.: US 10,474,827 B2
(45) Date of Patent: Nov. 12, 2019

(54) APPLICATION RECOMMENDATION METHOD AND APPLICATION RECOMMENDATION APPARATUS

(71) Applicant: Beijing Zhigu Rui Tuo Tech Co. Ltd, Beijing (CN)

(72) Inventors: Hengshu Zhu, Beijing (CN); Kuifei Yu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 219 days.

(21) Appl. No.: 15/326,024

(22) PCT Filed: Jul. 9, 2015

(86) PCT No.: PCT/CN2015/083632
§ 371 (c)(1),
(2) Date: Jan. 12, 2017

(87) PCT Pub. No.: WO2016/008383
PCT Pub. Date: Jan. 21, 2016

(65) Prior Publication Data
US 2017/0206361 A1    Jul. 20, 2017

(30) Foreign Application Priority Data
Jul. 16, 2014  (CN) .......................... 2014 1 0339323

(51) Int. Cl.
*G06F 21/57*    (2013.01)
*G06F 16/2457*    (2019.01)
(Continued)

(52) U.S. Cl.
CPC ...... *G06F 21/577* (2013.01); *G06F 16/24578* (2019.01); *G06Q 30/0282* (2013.01); *G06Q 50/01* (2013.01); *G06F 2221/033* (2013.01)

(58) Field of Classification Search
CPC .................................................... G06F 21/577
See application file for complete search history.

(56) References Cited

U.S. PATENT DOCUMENTS

2012/0096435 A1    4/2012  Manolescu et al.
2013/0227683 A1    8/2013  Bettini et al.
(Continued)

FOREIGN PATENT DOCUMENTS

CN    103024606 A    4/2013
CN    103338223 A    10/2013
(Continued)

OTHER PUBLICATIONS

International Search Report for PCT Application No. PCT/CN2015/083632, dated Sep. 28, 2015, 4 pages.
(Continued)

*Primary Examiner* — David J Pearson
(74) *Attorney, Agent, or Firm* — Amin, Turocy & Watson, LLP

(57) ABSTRACT

An application recommendation method and a recommendation apparatus are disclosed. A method comprises: acquiring a popularity value and a security risk value of each application in multiple applications; and ranking the multiple applications according to the popularity value and the security risk value. In a technical solution of embodiments of the present application, multiple applications are ranked according to popularities and security risk vales of the applications to preferentially recommend, to a user, an application that better meets popularity and security preferences of a user, to cause the user being protected in terms of security and/or privacy while enjoying the application having abundant functions.

44 Claims, 11 Drawing Sheets

(51) Int. Cl.
*G06Q 30/02* (2012.01)
*G06Q 50/00* (2012.01)

(56) References Cited

U.S. PATENT DOCUMENTS

| | | | | |
|---|---|---|---|---|
| 2013/0290319 A1* | 10/2013 | Glover | ............... | G06F 17/3053 707/723 |
| 2013/0290322 A1* | 10/2013 | Prosnitz | ............ | G06F 17/30554 707/723 |
| 2014/0214610 A1* | 7/2014 | Moshir | .............. | G06Q 20/4016 705/26.35 |
| 2015/0186940 A1* | 7/2015 | Harris | ................ | G06Q 30/0256 705/14.54 |

FOREIGN PATENT DOCUMENTS

| | | |
|---|---|---|
| CN | 103902729 A | 7/2014 |
| CN | 104090967 A | 10/2014 |
| WO | 2016008383 A1 | 1/2016 |

OTHER PUBLICATIONS

Zhang Yehui, Peng Xinguang and Cai, Zhibiao, "Detection of malicious Android application based on permissions and category", Computer Engineering and Design, May 2014, vol. 35, No. 5, 1568-1571, 4 pages.

\* cited by examiner

APPLICATION RECOMMENDATION METHOD AND APPLICATION RECOMMENDATION APPARATUS

RELATED APPLICATION

The present application is a U.S. National Stage filing under 35 U.S.C. § 371 of international patent cooperation treaty (PCT) application No. PCT/CN2015/083632, filed Jul. 9, 2015, and entitled "APPLICATION RECOMMENDATION METHOD AND APPLICATION RECOMMENDATION APPARATUS", which claims the benefit of priority to Chinese Patent Application No. 201410339323.3, filed on Jul. 16, 2014, which applications are hereby incorporated into the present application by reference herein in their respective entireties.

TECHNICAL FIELD

The present application relates to a data processing method, and in particular, to recommendation of application(s).

BACKGROUND

Recently, along with the rapid development of mobile devices and a mobile Internet, the number of mobile applications has experienced an explosive growth. Meanwhile, functions of the mobile applications are extended extremely to enrich and meet various demands of users, such as Location Based Services (LBS) and Social Networking Services (SNS). In fact, the abundant functions depend on using permissions of various types of user data and devices, such as a location access permission, a contacts access permission, and a short message access permission. Using of the access permissions enables the users to use powerful functions of applications, but also generates a worry on privacy and security of their own.

SUMMARY

An example objective of the present application is to provide a technical solution of recommending application(s).

In a first aspect, an example embodiment of the present application provides an application recommendation method, comprising:

acquiring a popularity value and a security risk value of each application in multiple applications; and ranking the multiple applications according to the popularity value and the security risk value.

In a second aspect, an example embodiment of the present application provides an application recommendation apparatus, comprising:

an acquiring module, configured to acquire a popularity value and a security risk value of each application in multiple applications; and a ranking module, configured to rank the multiple applications according to the popularity value and the security risk value.

In a third aspect, an example embodiment of the present application provides a computer readable storage device comprising executable instructions that, in response to execution, cause a device comprising a processor to perform operations, comprising:

acquiring a popularity value and a security risk value of each application in multiple applications; and ranking the multiple applications according to the popularity value and the security risk value.

In at least one example embodiment of the present application, multiple applications are ranked according to popularities and security risk vales of the applications to preferentially recommend, to a user, an application that better meets popularity and security preferences of the user, to cause the user being protected in terms of security and privacy while enjoying the application having abundant functions.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
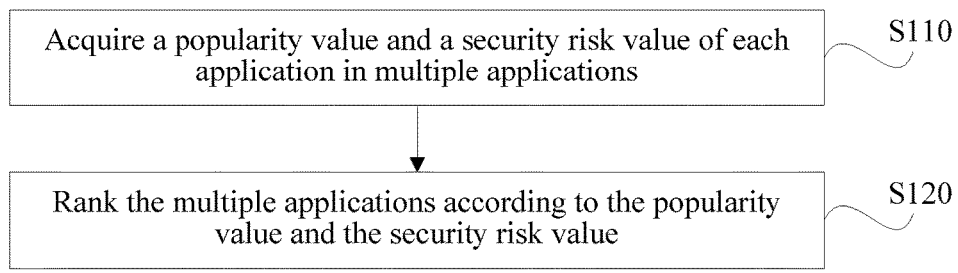
FIG. 1 is a flow chart of an application recommendation method according to an example embodiment of the present application.

Example embodiments of the present application are further described in detail through the accompanying drawings (the same reference numerals in several accompanying drawings indicate the same elements) and embodiments.

The following embodiments are used to describe the present application, but are not intended to limit the scope of the present application.

Persons skilled in the art should understand that terms such as "first" and "second" in the present application are merely used to distinguish different steps, devices, modules or the like, and the terms neither represent any specific technical meanings nor indicate necessary logic orders of them.

As shown in FIG. 1, an example embodiment of an embodiment of the present application provides an application recommendation method, comprising:

S110: Acquire a popularity value and a security risk value of each application in multiple applications; and S120: Rank the multiple applications according to the popularity value and the security risk value.

For example, an application recommendation apparatus provided in the present application is used to execute this embodiment to execute S110 to S120. Specifically, the application recommendation apparatus may be disposed in a user equipment or a server device in a manner of software, hardware, or a combination of software and hardware.

In the embodiment of the present application, multiple applications are ranked according to popularities and security risk vales of the applications to preferentially recommend, to a user, an application that better meets popularity and security preferences of the user, to cause the user being protected in terms of security and privacy while enjoying the application having abundant functions.

The steps of the method in the embodiment of the present application are further described:

S110: Acquire a popularity value and a security risk value of each application in multiple applications.

In an example embodiment of the embodiment of the present application, the acquiring the popularity value in step S110 may comprise:

acquiring popularity information of each application; and acquiring the popularity value of each application according to the popularity information of each application.

In an example embodiment of the present application, the popularity information may be, for example: a popularity rank, a user score, the number of downloads, activeness, and a price of each application in the multiple applications. In an implementation manner, the popularity information as described above may be obtained according to historical data of the multiple applications.

In an example embodiment of the present application, in order to regularize the popularity value into an interval between 0 and 1 to facilitate subsequent calculation, the popularity information may be, for example, the popularity rank; and the acquiring the popularity value of each application according to the popularity information of each application may be, for example:

using an inverse number of the popularity rank of each application as the popularity value.

It is noted that, in addition to the inverse number of the popularity rank, the popularity value may also be obtained in another way, for example, the popularity value is obtained by multiplying the popularity information with a coefficient. Or, the popularity information is converted into the popularity value by using a first conversion function defined by the user.

In an example embodiment, the popularity value acquired in step S110 is the popularity information as described above.

In an example embodiment of the embodiment of the present application, the acquiring the security risk value in step S110 may comprise:

acquiring security risk information of each application; and acquiring the security risk value of each application according to the security risk information of each application.

In some example embodiments, the security risk information of each application may be, for example: a security risk rank of each application in the multiple applications, and an application security risk score of each application. In an example embodiment, the security risk rank of each application may be acquired by ranking the multiple applications according to the application security risk score of each application.

In an example embodiment of the embodiment of the present application, in order to regularize the popularity value into an interval between 0 and 1 to facilitate subsequent calculation, the acquiring the security risk value of each application according to the security risk information of each application may be, for example:

using an inverse number of the security risk rank of each application in the multiple applications as the security risk value of each application.

It is noted that, in addition to the inverse number of the security risk rank, the security risk may also be obtained in another way, for example, the security risk value is obtained by multiplying the security risk information with a coefficient. Or, the security risk information is converted into the security risk value by using a second conversion function defined by the user.

In an example embodiment, the security risk value acquired in step S110 is the security risk information as described above, for example, the security risk value is the application security risk score.

In the embodiment of the present application, there may be various methods of acquiring the application security risk score, for example:

1) the security risk score of each application may be obtained by using an application-based mobile code detection and a system process monitoring method; or, 2) the application security risk score of each application may be obtained based on an estimation method of displaying a risk function manually; or, 3) the application security risk score of each application may be obtained by scoring the security risk of each application according to opinions of experts in the art; or, 4) the application security risk score of each application may be obtained through a bipartite graph model of an application and permission according to a potential relationship between an application and permission.

The application security risk score obtained by the method 4) is more accurate, and the method 4) is further described in the following.

Figure 2:
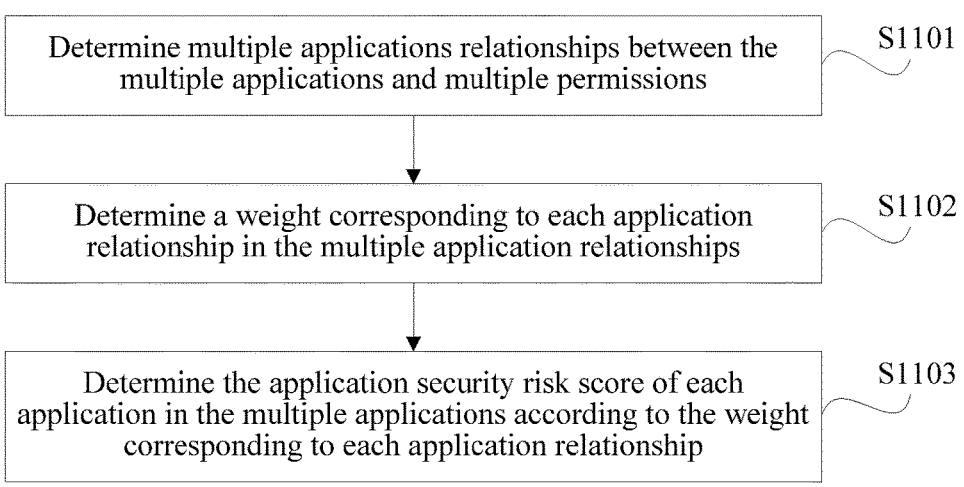
FIG. 2 is a flow chart of acquiring an application security risk score in an application recommendation method according to an example embodiment of the present application.

As shown in FIG. 2, in an example embodiment of the embodiment of the present application, the acquiring an application security risk score of each application comprises:

S1101: Determine multiple applications relationships between the multiple applications and multiple permissions, wherein each application relationship in the multiple applications relationships is corresponding to one permission in the multiple permissions applied by one application in the multiple applications;

S1102: Determine a weight corresponding to each application relationship in the multiple application relationships; and S1103: Determine the application security risk score of each application in the multiple applications according to the weight corresponding to each application relationship.

Figure 3:
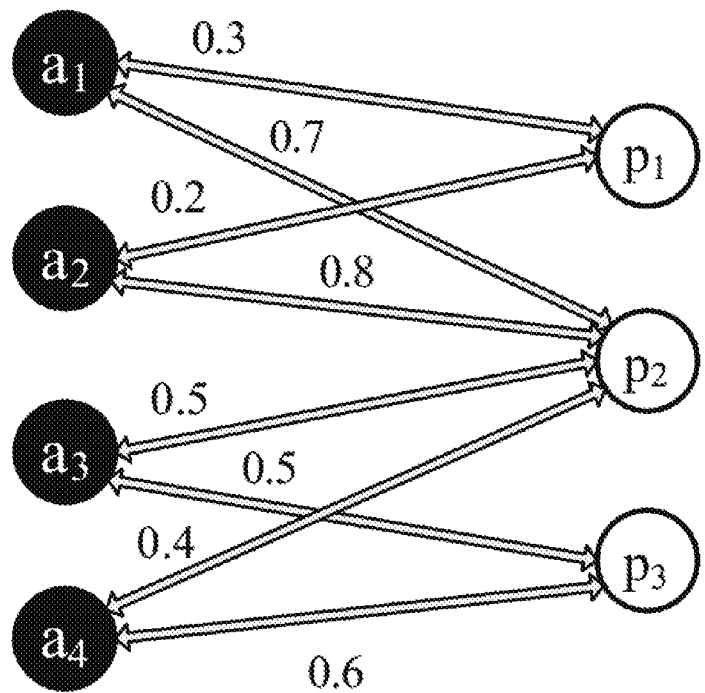
FIG. 3 is a schematic diagram of a bipartite graph of an application and a permission in an application recommendation method according to an example embodiment of the present application.

As shown in FIG. 3, in the embodiment of the present application, in consideration of properties of the application and the permission, the inventor proposes a model based on bipartite graph to determine a relationship between the application and the permission. The multiple applications are used as a first group of nodes in the bipartite graph, the multiple permissions are used as a second group of nodes in the bipartite graph, and a connection between the two group of nodes is determined by an application relationship of the application and the permission, that is, merely when one application applies for a permission, the application and the permission have an application relationship, and a connection is established.

In the embodiment of the present application, relationships between the multiple applications and the multiple permissions are indicated by using a bipartite graph shown in FIG. 3, and the bipartite graph G may be expressed as: G={V, E, W}, wherein V is a node set, and $V=\{V^a, V^p\}$, $V^a$ is an application set, comprising the multiple applications $a_1 \sim a_M$, that is, $V^a=\{a_1, \ldots, a_M\}$, and M is the number of the multiple applications and is a positive integer;

$V^p$ is a permission set, comprising the multiple permissions $p_1 \sim p_N$, that is, $V^p=\{p_1, \ldots, p_N\}$; and N is the number of the multiple permissions and is a positive integer;

E is an application relationship set, wherein, merely when one application $a_i$ in the multiple applications applies for a permission $p_j$ in the multiple permissions, an application relationship $e_{ij} \in E$ exists; and W is a weight set, and a weight $w_{ij} \in W$ indicates a weight of the application relationship $e_{ij}$.

In the example embodiment shown in FIG. 3, the bipartite graph comprises 4 applications $a_1 \sim a_4$ and 3 permissions $p_1 \sim p_3$, (in the embodiment shown in FIG. 3, the applications $a_1 \sim a_4$ are respectively Angry Bird (game), Fruit Ninja (game), FaceBook (social), and Minecraft (game); the permission $p_1$ is reading a mobile phone state, the permission $p_2$ is accessing an accurate location, and the permission $p_3$ indicates reading a contact; the application relationship set comprises 8 application relationships (indicated by connection lines between the applications and the permissions in FIG. 3): $e_{11}$, $e_{12}$, $e_{21}$, $e_{22}$, $e_{32}$, $e_{33}$, $e_{42}$ and $e_{43}$, and weights respectively corresponding to them are 0.3, 0.7, 0.2, 0.8, 0.5, 0.5, 0.4 and 0.6.

In the embodiment of the present application, the weight $w_{ij}$ indicates a correlation between the application $a_i$ and the permission $p_j$. In an example embodiment, the weight $w_{ij}$ indicates a probability of the application $a_i$ applying for the permission $p_j$. Here, the probability of the application $a_i$ applying for the permission $p_j$ refers to a possibility of the application ai applying for the permission pj before it is determined which permissions have been applied for by it. For example, for the application relationship e11 in FIG. 3, 0.3 indicates that a probability of the application a1 applying for the permission p1 is 0.3.

In other example embodiments, the weight may further be determined according to other references to indicate a correlation degree between the application and the permission, and especially, in an example embodiment, the weight may be determined according to a set instruction of the user.

As described above, in an example embodiment of the present application, when the weight is determined in step S1102, the weight corresponding to each application relationship may be determined according to the probability of the application corresponding to each application relationship applying for the permission.

In the embodiment of the present application, the probability may be acquired according to historical data. Optionally, in an example embodiment, the weight is determined according to permission application historical data of all applications in an application classification to which the application corresponding to each application relationship belongs. In this implementation manner, the application classification may be a classification divided according to a function of the application, such as game, office, and map; and may further be a classification performed according to a developer of the application, or may be a clustering classification performed according to a similarity in another aspect of the application. It is noted that the application classification may further be a classification performed according to another classification standard.

Optionally, in an example embodiment of the present application, the weight may be obtained according to a ratio of a frequency of all applications in the application classification, in the application classification to which the application belongs, applying for the permission to a sum of multiple frequencies of all the applications respectively applying for the multiple permissions. The following formula may be used for expression:

$$w_{ij} = \frac{f_{ij}}{\sum_{p_j \in V^p} f_{ij}},$$

wherein $f_{ij}$ indicates a frequency of an application, in the application classification to which the application $a_i$ belongs, applying for the permission $p_j$.

In an example embodiment of the present application, to obtain a normalized frequency, the frequency corresponding to the permission may be obtained according to a ratio of a frequency of all applications in the application classification applying for the permission to a sum of multiple frequencies of all the applications respectively applying for the multiple permissions. Definitely, in another possible implementation manner of the embodiment of the present application, the frequency may be determined in another manner.

In another example embodiment of the present application, in addition to determining the weight corresponding to each application relationship according to the application frequency of the permission, the weight may be further determined according to another parameter, for example, an external priori knowledge, and the priori knowledge may be, for example, an opinion of an expert in the art, a correlation value between the application and the permission calculated by using another method, and the like.

In an example embodiment of the present application, optionally, step S1103 may use at least one constraint to make the application security risk score of the application more accurate.

In an example embodiment, the at least one constraint comprises a first constraint, and the first constraint comprises:

the higher a weight corresponding to an application relationship in the multiple application relationships is, the closer an application security risk score of an application corresponding to the application relationship and a permission security risk score of a permission corresponding to the application relationship are.

In the embodiment of the present application, the application security risk score indicates the magnitude of the security risk of the corresponding application, and the permission security risk score indicates the magnitude of the security risk of the corresponding permission.

It is noted that the first constraint considers a primary relationship between the application and the permission. The higher a weight between the application and the permission is, the stronger the correlation between the two is. When one of them has a high risk, the risk of the other is definitely high, and vice versa. By using the embodiment shown in FIG. 3 as an example, for the permission $p_2$, weights respectively corresponding to 4 corresponding application relationships $e_{12}$, $e_{22}$, $e_{32}$ and $e_{42}$ are 0.7, 0.8, 0.5 and 0.4, and therefore, it may be known according to the first constraint, the permission security risk score of the permission $p_2$ should be the closest to the application security risk score of the application $a_2$.

Optionally, in an example embodiment, the at least one first constraint comprises a second constraint, and the second constraint comprises:

the more similar permission application statuses of two applications in the multiple applications are, the closer application security risk scores of the two applications are.

In this example embodiment, the permission application status comprises: the permission applied for by the application and the weight corresponding to application relationship for the application to apply for the permission. The more similar permissions applied by two applications are, the more similar weights for applying for the same permission at the same time are, and the closer application security risk scores of the two are. As shown in FIG. 3, the application $a_1$ and the application $a_2$ both apply for the permission $p_1$ and the permission $p_2$, and compared with the application $a_3$ or application $a_4$, in this case, application security risk scores of the two applications should be closer; moreover, the two applications not only apply for the same permission, weights for them to respectively apply for the permission $p_1$ and the permission $p_2$ are close, and therefore, it can be predicted that, application security risk scores of the application $a_1$ and the application $a_2$ should be closer. Likewise, application security risk scores of the application $a_3$ and the application $a_4$ should be closer. Definitely, the application security risk score of the application $a_1$ or application $a_2$ and the application $a_3$ or application $a_4$ should not be close.

Optionally, in an example embodiment, an application may be expressed in a vector by using weights of all application relationships corresponding to the application, for example, the application $a_i$ is expressed as $\vec{a}_i = \{w_{i1}, \ldots, w_{iN}\}$, wherein the vector $\vec{a}_i$ comprises N elements respectively corresponding to N permissions, and when the application applies for a permission, a corresponding element is a corresponding weight; when the application $a_i$ does not apply for a permission, the element may be replaced with 0 (in this case, it may be considered that a weight of the application $a_i$ applying for the permission is 0); and the application $a_j$ is expressed as $\vec{a}_j = \{w_{j1}, \ldots, w_{jN}\}$. For example, in the embodiment shown in FIG. 2, corresponding to the application $a_1$, a vector $\vec{a}_1 = \{0.3, 0.7, 0\}$. In this case, a cosine distance between vectors corresponding to the two applications may be used to determine the similarity of the two applications:

$$s_{ij}^a = \cos(\vec{a}_i, \vec{a}_j) = \frac{\vec{a}_i \cdot \vec{a}_j}{\|\vec{a}_i\| \cdot \|\vec{a}_j\|}$$

It is noted that another method for expressing the similarity between two vectors may also be used in the embodiment of the present application to determine the similarity of the two applications, for example, the similarity of the two vectors may be determined by using an Euclidean distance or a Kullback-Leibler Divergence between the two vectors.

Optionally, in an example embodiment, the at least one first constraint comprises a third constraint, and the third constraint comprises:

for two permissions in the multiple permissions, the more similar applied statuses of the two permissions are, the closer permission security risk scores of the two permissions are.

In the embodiment of the present application, the applied status of the permission comprises an application applying for the permission and a weight of a corresponding application relationship for the application to apply for the permission. The more similar the applications applying for the two permissions are and the more similar the weights of the application relationships for the same application respectively applying for the two permissions are, the closer the permission security risk scores corresponding to the two permissions are. Still by using the implementation manner shown in FIG. 3 as an example, it can be seen that, the permission $p_1$ and the permission $p_2$ are applied by the application $a_1$ and the application $a_2$ at the same time, and meanwhile, weights of the two respectively being applied by the application $a_1$ and the application $a_2$ are similar, the permission $p_2$ and the permission $p_3$ are applied by the application $a_3$ and the application $a_4$ at the same time, while the permission $p_1$ and the permission $p_3$ are not applied by the same application; therefore, it can be known that in the permission $p_2$ and the permission $p_3$, the permission security risk score of the permission $p_1$ is closer to the permission security risk score of the permission $p_2$. It is noted that, if the permission $p_3$ is merely applied by the application $a_1$ and the application $a_2$, permission security risk scores of the permission $p_1$ and the permission $p_3$ will be closer.

Likewise, optionally, in an example embodiment, a permission may be expressed in a vector by using weights of all application relationships corresponding to the permission, for example, the permission $p_i$ is expressed as $\vec{p}_i = \{w_{i1}, \ldots, w_{iN}\}$, wherein the vector $\vec{p}_i$ comprises M elements respectively corresponding to M applications, and when an application applies for the permission $p_i$, a corresponding element is a corresponding weight; when an application does not apply for the permission $p_i$, the element may be replaced with 0 (in this case, it may be considered that a weight of the application applying for the permission is 0); and the permission $p_j$ is expressed as $\vec{p}_j = \{w_{j1}, \ldots, w_{jN}\}$. For example, in the embodiment shown in FIG. 3, corresponding to the permission $p_1$, the vector $\vec{p}_1 = \{0.3, 0.2, 0, 0\}$, and here, two 0s respectively indicate that the application $a_3$ and the $a_4$ do not apply for the permission $p_1$. In this case, a cosine distance between vectors corresponding to the two permissions may be used to determine the similarity of the two permissions:

$$s_{ij}^p = \text{Cos}(\vec{p}_i, \vec{p}_j) = \frac{\vec{p}_i \cdot \vec{p}_j}{\|\vec{p}_i\| \cdot \|\vec{p}_j\|}$$

Likewise, It is noted that another method used to indicate the similarity between two vectors may also be used in the embodiment of the present application to determine the similarity of the two permissions, for example, the Euclidean distance as described above.

To cause the obtained application security risk score more accurate, external priori knowledge may be introduced in the calculation of the application security risk score, and therefore, optionally, in an example embodiment, the at least one constraint further comprises a fourth constraint, and the fourth constraint comprises:

application security risk scores of the multiple applications are respectively consistent with priori application security risk scores of the multiple applications; and permission security risk scores of the multiple permissions are respectively consistent with priori permission security risk scores of the multiple permissions.

In the embodiment of the present application, the application security risk score of the multiple applications and the permission security risk score of the multiple permissions being respectively consistent with the priori application security risk score and the priori permission security risk score means that the application and permission security risk scores should meet priori knowledge, for example: a priori application security risk score of the first application is greater than a priori application security risk score of the second application, and therefore, the application security risk score of the first application generally should be greater than the application security risk score of the second application. In the embodiment of the present application, introduction of the fourth constraint may cause the acquired application security risk score be converged to a suitable range as soon as possible. In an example embodiment, for an application, there may be multiple applications security risk scores meeting the above first, second and third constraints, and then, the fourth constraint may help to determine, in the multiple applications security risk scores corresponding to the application, which one is the application security risk score more appropriate for the application.

In the embodiment of the present application, the priori application security risk score and the priori permission security risk score may respectively obtained in various manners, for example, in some possible implementation manners, a security risk score set by an expert in the art may be used, and a corresponding security risk score may also be obtained by constructing a security classification according to an external risk report, or a security risk score may be obtained by using a security mode that is the most advanced in the related art. Especially, in an example embodiment, the priori application security risk score and the priori permission security risk score may be acquired by using presetting of the user.

In an example embodiment of the present application, in order to cause the corresponding application and permission security risk scores have higher acquisition efficiency, a Naive Bayes with information Priors (PNB) may be used to obtain the priori application security risk score and the priori permission security risk score.

In an example embodiment of the present application, an application security risk score of each application in the multiple applications may be determined according to the weight corresponding to each application relationship and the first to fourth constraints as described above.

For example, in an example embodiment, a cost function in combination with the four constraints is defined, and for example, is expressed as follows:

$$Q(a, p) = \frac{\lambda}{2} \cdot \left\{ \sum_i \|R_i^a - \tilde{R}_i^a\|^2 + \sum_j \|R_j^p - \tilde{R}_j^p\|^2 \right\} +$$

$$\frac{\mu}{2} \cdot \left\{ \sum_{i,j} s_{ij}^a \|R_i^a - R_j^a\|^2 + \sum_{i,j} s_{ij}^p \|R_i^p - R_j^p\|^2 \right\} + \frac{1}{2} \sum_{i,j} w_{ij} \|R_i^a - R_j^p\|^2$$

wherein, $R_i^a$ indicates an application security risk score of an application $a_i$, $\tilde{R}_i^a$ indicates a priori application security risk score of the application $a_i$, $\tilde{R}_j^p$ indicates a permission security risk score of a permission $p_j$, $\tilde{R}_j^p$ indicates a priori permission security risk score of the permission $p_j$, the first part (the part in the first brace) indicates the fourth constraint, the second part (the part in the second brace) indicates the second and third constraints, and the third part indicates the first constraint. Parameters $\lambda$ and $\mu$ are respectively a parameter of the fourth constraint and a parameter of the second and third constraints, and are used to control the first part and the second part; a user may set the two parameters as applicable. It can be seen that, when $\lambda$ and $\mu$ are zero, the cost function of the embodiment of the present application is not constrained by the second, third and fourth constraints, and merely the first constraint needs to be taken into consideration.

It can be seen that, to meet the above constraints, suitable $R_i^a$ and $R_j^p$ are obtained to cause the cost function as smaller as possible. Therefore, in an example embodiment, the $R_i^a$ and $R_j^p$; may be granted with initial values first, for example, values between 0 and 1, and in an example embodiment, for example, it is set that $R_i^a = 1/M$, $R_j^p = 1/N$, and the two values are iterated and updated by using a gradient descent method, until the cost function is smaller than a set threshold.

It is noted that the cost function is merely a possible manner used to obtain the application security risk score in the embodiment of the present application, and the application security risk score in the embodiment of the present application may further be obtained in another method.

It may be known that, after the application security risk score of each application is obtained, the security risk value of each application may be obtained according to the above example embodiment.

S120: Rank the multiple applications according to the popularity value and the security risk value.

In the embodiment of the present application, there are multiple manners for ranking the multiple applications according to the popularity value and the security risk value in step S120, for example:

1) performing first ranking on the multiple applications according to the popularity value of each application, wherein, in a case that at least two applications in the multiple applications have the same popularity value, second ranking is performed on the at least two applications according to the security risk values of the at least two applications.

In this example embodiment, overall ranking is performed mainly on the multiple applications according to the popularity values, wherein, when there are applications having the same popularity value, for example, when there are three applications have the same popularity value, local ranking is further performed on the three applications according to security risk values of the three applications.

Or, 2) performing first ranking on the multiple applications according to the security risk value of each application, wherein, in a case that at least two applications in the multiple applications have the same security risk value, second ranking is performed on the at least two applications according to the popularity values of the at least two applications.

Similar to the ranking manner in 1), in the embodiment of the present application, overall ranking is performed on all applications first according to the security risk values of the applications, and when there are two or more applications have the same security risk value, local ranking is performed on the two or more applications according to popularities of the two or more applications.

It is noted, when the multiple applications are ranked by using the methods 1) or 2), the popularity value of each application may be the popularity information, for example, the number of downloads of the application; the security risk value of each application may be the security risk information, for example, the application security risk score.

In addition to the above two ranking methods, in order to perform better ranking on the multiple applications according to the security risk value and the popularity value, the inventor of the present application applies an investment combination theory to an example embodiment of the present application, in which the popularity values of the multiple applications are considered as future profits of invested stocks, and the security risk values of the multiple applications are considered as risks of the invested stocks, so as to obtain a combination of multiple applications having high popularity and small risk.

Figure 4:
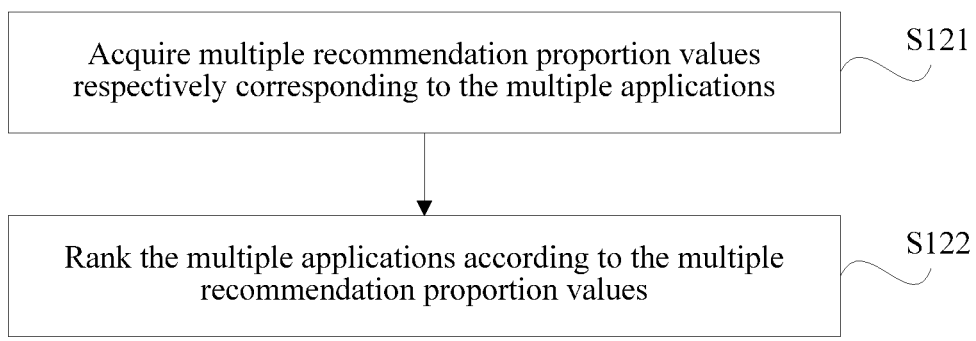
FIG. 4 is a flow chart of ranking applications in an application recommendation method according to an example embodiment of the present application.

The ranking method is further described in the following, as shown in FIG. 4:

S121: Acquire multiple recommendation proportion values respectively corresponding to the multiple applications, wherein a total popularity value of the multiple applications obtained according to the popularity values and the multiple recommendation proportion values and a total security risk value of the multiple applications obtained according to the security risk values and the multiple recommendation proportion values meet at least one set standard.

S122: Rank the multiple applications according to the multiple recommendation proportion values.

In the embodiment of the present application, the multiple recommendation proportion values are obtained, to cause the total popularity value and the total security risk value of the multiple applications meet the set standard.

In an example embodiment of the present application, the total popularity value of the multiple applications are obtained in the following manner:

obtaining a single popularity value of each application according to a product of a recommendation proportion of each application and the popularity value, and obtaining the total popularity value by summarizing the single popularity values of the multiple applications.

In an example embodiment, for example, the total popularity value of the multiple applications may be calculated by using the following formula:

$$E[\gamma] = \sum_{i}^{n} \varpi_i \cdot r_i$$

wherein, $\gamma=\{(a_i,\overline{\varpi}_i)\}$, $$\sum_{i} \varpi_i = 1$$

and is satisfied, wherein $\overline{\varpi}_i$ is a recommendation proportion value corresponding to an application $a_i$ in the multiple applications (n applications in this implementation manner), and can indicate how much attention a recommendation system hopes a target user paying to the application $a_i$; and $r_i$ is a popularity value corresponding to the application $a_i$. In this implementation manner, in order to limit the popularity value in an interval between 0 and 1, it is set that $r_i$ is an inverse number of the popularity of the application $a_i$ in the multiple applications. For example, when the popularity rank of the application $a_i$ in the multiple applications is the $2^{nd}$, $r_i=\frac{1}{2}$.

In an example embodiment of the present application, the obtaining the total security risk value according to the security risk value and the multiple recommendation proportion values comprises:

obtaining an independent security risk value of each application according to the recommendation proportion value and the security risk value corresponding to each application;

obtaining a correlated security risk value of each application according to the recommendation proportion value and the security risk value corresponding to each application, and a risk correlation coefficient between each application and each other application in the multiple applications; and obtaining the total security risk value according to the independent security risk value and the correlated security risk value of each application.

In an example embodiment, a single security risk value of an application in the multiple applications is a sum of an independent security risk value and a correlated security risk value of the application. The total security risk value of the multiple applications is a sum of single security risk values of the multiple applications.

In an example embodiment, for example, the total security risk value of the multiple applications may be calculated by using the following formula:

$$R[\gamma] = \sum_{i}^{n} \left( \varpi_i^2 \sigma_i^2 + 2 \sum_{j=i+1}^{n} \varpi_i \varpi_j \sigma_i \sigma_j J_{ij} \right)$$

wherein, $\sigma_i$ is a security risk value corresponding to an application $a_i$ in the multiple applications; in the embodiment of the present application, to cause the security risk value have comparability with the popularity value, an inverse number of a security risk rank of the application $a_i$ in the multiple applications is selected as the security risk value of the application; $\overline{\varpi}_i^2 \sigma_i^2$ corresponds to an independent security risk value of the application $a_i$; $\overline{\varpi}_i \overline{\varpi}_j \sigma_i \sigma_j J_{ij}$ corresponds to a correlated security risk value of the application $a_i$ and another application $a_j$ in the multiple applications, wherein, $J_{ij}$ is a risk correlation coefficient of the application $a_i$ and the application $a_j$. In an example embodiment, a risk correlation coefficient between two applications may be estimated by using similarity of application permissions of the two applications.

In an example embodiment of the present application, a Jaccard similarity coefficient is used as the risk correlation coefficient between two applications in the embodiment of the present application, and specifically, the risk correlation coefficient between each application and an application in other applications is obtained according to a number of all permissions applied by each application, a number of all permissions applied by the application in the other applications, and a number of all permissions applied jointly by each application and the application in the other applications.

For example, in an example embodiment, the risk correlation coefficient of the application $a_i$ and the application $a_j$ is:

$$J_{ij}=N_{ij}/(N_i+N_j-N_{ij}).$$

wherein, $N_{ij}$ is the number of all permissions applied jointly by the application $a_i$ and the application $a_j$; $N_i$ is the number of all permissions applied by the application $a_i$; and $N_j$ is the number of all permissions applied by the application $a_j$.

It is noted that, in addition to the Jaccard similarity coefficient, another correlation coefficient may also be used in the embodiment of the present application to obtain the risk correlation coefficient between the two applications, such as a Pearson correlation coefficient and a cosine similarity degree.

In an example embodiment of the present application, the total popularity value and the total security risk value meeting the at least one set standard comprises:

a difference between the total popularity value and the total security risk value is the maximum.

That is, the multiple recommendation proportion values acquired in the embodiment of the present application cause that a difference between the total popularity value and the total security risk value is the maximum.

In another example embodiment of the present application, in consideration that different users may have different risk tolerance preferences, for example, some users pay attention to security risks of applications and have small tolerance; while some users pay less attention to security risks of applications and have large tolerance. Therefore, the method obtains a weighted total security risk value of the multiple applications according to a user risk tolerance preference and the total security risk value.

For example, in an example embodiment, the weighted total security risk value of the multiple applications is the total security risk value multiplied by a risk preference coefficient. In an example embodiment, the risk preference coefficient is correlated to a level of risk tolerance selected by the user.

In this case, the total popularity value and the total security risk value meeting the at least one set standard comprises:

a difference between the total popularity value and the weighted total security risk value is the maximum.

In the example embodiment of the present application, for example, the multiple recommendation value proportions causing the difference to be the maximum may be acquired by using an Efficient Frontier method, an Expectation Maximization method, a Gradient Descent method, or the like.

In still another possible implementation manner of the embodiment of the present application, the total popularity value and the total security risk value meeting the at least one set standard comprises:

the total security risk value meeting a set maximum risk standard, and the total popularity value being the maximum.

In this example embodiment, it is unnecessary that the total security risk value is the minimum, and as long as the total security risk value meets the maximum risk standard, in this case, the higher total popularity of the multiple applications is the better. The maximum risk standard may be a fixed value, and may also be set according to a preference of the user.

In yet another example embodiment of the present application, the total popularity value and the total security risk value meeting the at least one set standard comprises:

the total popularity value meeting a set minimum popularity standard, and the total security risk value being the minimum.

In this example embodiment, it is unnecessary that the total popularity value of the application is the maximum, as long as the total popularity value meets the minimum popularity standard, and in this case, the lower total security risk of the multiple applications is the better. The maximum risk standard may be a fixed value, and may also be set according to a preference of the user.

In an example embodiment, the technical solution as described may be applied to an application distribution platform end, and configured to rank multiple applications according to security risk values and popularity values of the multiple applications of an application distribution platform, thereby performing recommendation of applications to the user based on the popularity and the security risk.

In another example embodiment, the technical solution as described may be applied to a user equipment end, and configured to rank multiple applications according to security risk values and popularity values of the multiple applications of the user equipment, thereby helping the user to determine a suitable application.

In an example embodiment, the multiple applications are mobile applications applied to a mobile user equipment (such as a mobile phone and a tablet computer), and the application distribution platform is an application market, for example, an Android application market such as Google Play, and an App Store application market of Apple.

It is noted that in the above method of the example embodiments of the present application, serial numbers of steps do not indicate priorities of execution sequences, the execution sequences of the steps should be determined according to functions and inner logic thereof, and should not constitute a limitation to implementation processes of the implementation manner of the present application.

Figure 5:
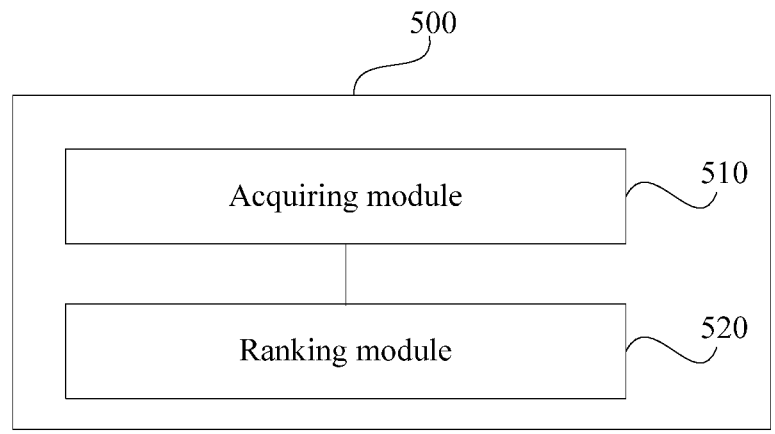
FIG. 5 is a schematic structural block diagram of an application recommendation apparatus according to an example embodiment of the present application.

As shown in FIG. 5, an example embodiment of the present application provides an application recommendation apparatus 500, comprising:

an acquiring module 510, configured to acquire a popularity value and a security risk value of each application in multiple applications; and a ranking module 520, configured to rank the multiple applications according to the popularity value and the security risk value.

In the embodiment of the present application, multiple applications are ranked according to popularities and security risk vales of the applications to preferentially recommend, to a user, an application that better meets popularity and security preferences of the user, to cause the user being protected in terms of security and privacy while enjoying the application having abundant functions.

The modules of the apparatus in the embodiment of the present application are further described.

Figure 6A:
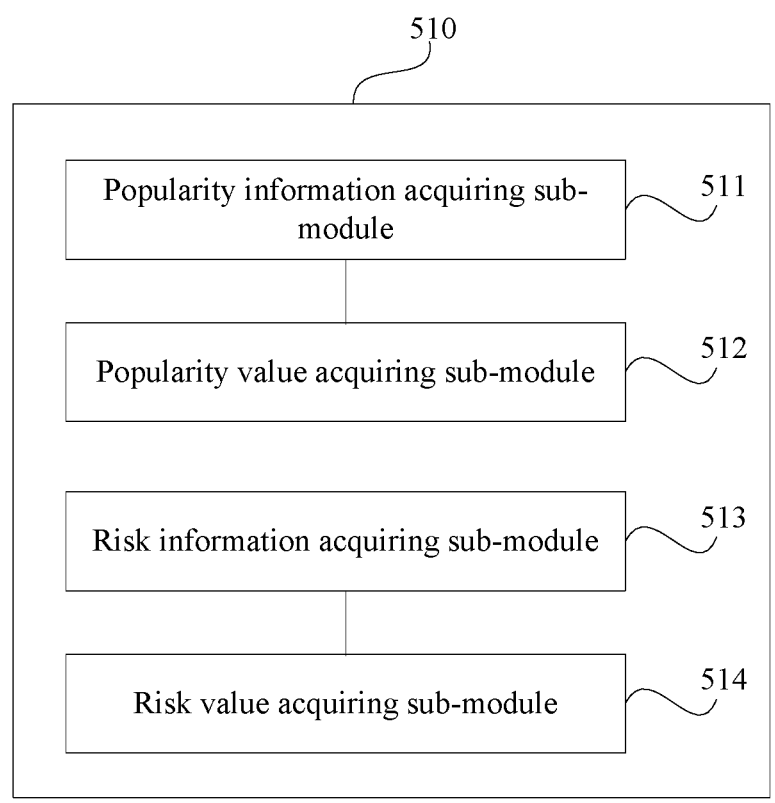
FIG. 6a to FIG. 6c are schematic structural block diagrams of an acquiring module in three application recommendation apparatuses according to an example embodiment of the present application.

As shown in FIG. 6a, in an example embodiment, the acquiring module 510 comprises:

a popularity information acquiring sub-module 511, configured to acquire popularity information of each application; and a popularity value acquiring sub-module 512, configured to obtain the popularity value of each application according to the popularity information of each application.

In an example embodiment of the present application, the popularity information may be, for example: a popularity rank, a user score, the number of downloads, activeness, and a price of each application in the multiple applications. In an implementation manner, the popularity information as described above may be obtained according to historical data of the multiple applications.

In an example embodiment of the present application, in order to regularize the popularity value into an interval between 0 and 1 to facilitate subsequent calculation, the popularity information may be, for example, a popularity rank, and the popularity value acquiring sub-module 512 may be, for example, configured to:

use an inverse number of the popularity rank of each application as the popularity value.

It is noted that, in addition to the inverse number of the popularity rank, the popularity value acquiring sub-module 512 may further obtain the popularity value in another way, for example, obtain the popularity value by multiplying the popularity information with a coefficient. Or, the popularity information is converted into the popularity value by using a first conversion function defined by the user.

In an example embodiment, the popularity value acquired by the acquiring module 510 is the popularity information as described above. That is, it is unnecessary to change the acquired popularity information, and the popularity information is directly used in the subsequent ranking of the ranking module 520.

In an example embodiment of the present application, the acquiring module 510 comprises:

a risk information acquiring sub-module 513, configured to acquire security risk information of each application; and a risk value acquiring sub-module 514, configured to obtain the security risk value of each application according to the security risk information of each application.

In some embodiments, the security risk information of each application acquired by the risk information acquiring sub-module 513 may be, for example: a security risk rank of each application in the multiple applications, and an application security risk score of each application. In an example embodiment, the security risk rank of each application may be acquired by ranking the multiple applications according to the application security risk score of each application.

In an example embodiment of the present application, in order to regularize the security risk value into an interval between 0 and 1 to facilitate subsequent calculation, the security risk information may be, for example, a security risk rank; and the security risk value acquiring sub-module 514 may be, for example, configured to:

use an inverse number of the security risk rank of each application in the multiple applications as the security risk value of each application.

It is noted that, in addition to the inverse number of the security risk rank, the security risk acquiring sub-module 514 may obtain the security risk in another way, for example, obtain the security risk value by multiplying the security risk information with a coefficient. Or, the security risk information is converted into the security risk value by using a second conversion function defined by the user.

In an example embodiment, the security risk value acquired by the acquiring module 510 is the security risk information as described above, for example, the security risk value is the application security risk score.

Figure 6B:
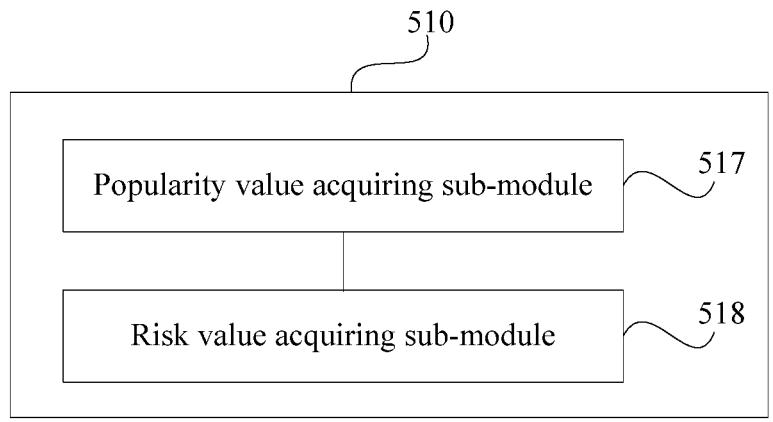

For example, in an example embodiment, as shown in FIG. 6b, the acquiring module 510 may comprise, for example, a popularity value acquiring sub-module 517 configured to directly acquire the popularity information to serve as the popularity value, and a risk value acquiring sub-module 518 configured to directly acquire the security risk information to serve as the security risk value.

Figure 6C:
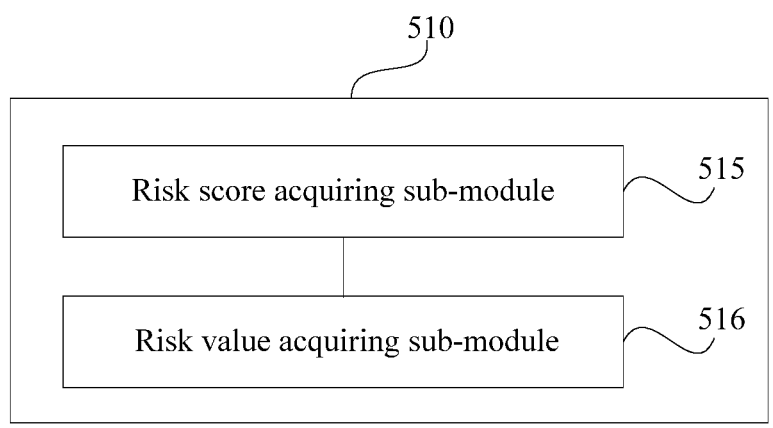

As shown in FIG. 6c, optionally, in an example embodiment, the security risk information is the application security risk score, and in this case, the acquiring module 510 comprises:

a risk score acquiring sub-module 515, configured to acquire an application security risk score of each application; and a risk value acquiring sub-module 516, configured to obtain the security risk value of each application according to the security risk score of each application.

In the embodiment of the present application, there may be various manners for the risk score acquiring sub-module 515 to acquire the application security risk score, for example:

1) the security risk score of each application may be obtained by using an application-based mobile code detection and a system process monitoring method; or, 2) the application security risk score of each application may be obtained based on an estimation method of displaying a risk function manually; or, 3) the application security risk score of each application may be obtained by scoring the security risk of each application according to opinions of experts in the art; or, 4) the application security risk score of each application may be obtained through a bipartite graph model of an application and permission according to a potential relationship between an application and permission.

The application security risk score obtained by the method 4) is more accurate, and the risk score acquiring sub-module 515 corresponding to the method 4) is further described in the following.

Figure 6D:
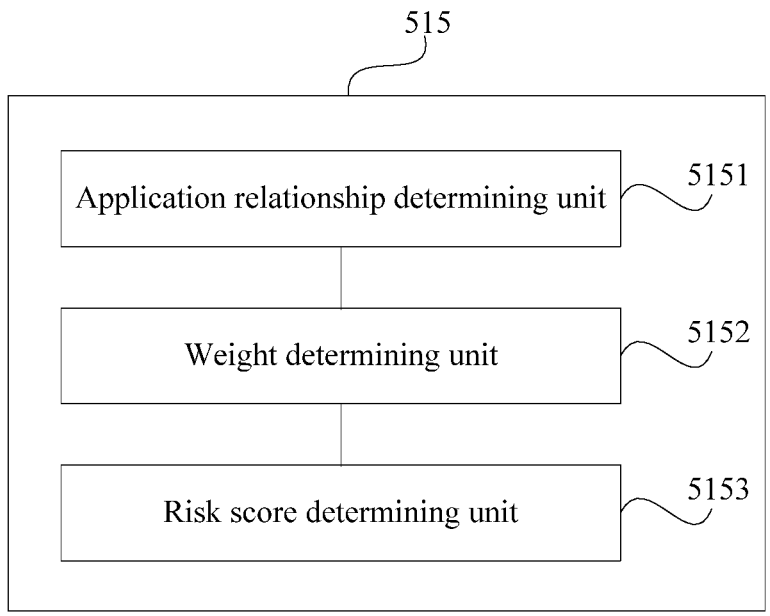
FIG. 6d and FIG. 6e are schematic structural block diagrams of a risk score acquiring sub-module in two application recommendation apparatuses according to an example embodiment of the present application.

As shown in FIG. 6d, in an example embodiment of the embodiment of the present application, the risk score acquiring sub-module 515 comprises:

an application relationship determining unit 5151, configured to determine multiple applications relationships between the multiple applications and multiple permissions, wherein each application relationship in the multiple applications relationships is corresponding to one permission in the multiple permissions applied by one application in the multiple applications;

a weight determining unit 5152, configured to determine a weight corresponding to each application relationship in the multiple application relationships; and a risk score determining unit 5153, configured to determine the application security risk score of each application in the multiple applications according to the weight corresponding to each application relationship.

The risk score acquiring sub-module 515 in the embodiment of the present application determines relationships between the multiple applications and the multiple permissions by using a model based on bipartite graph. Specifically, the corresponding descriptions in the embodiments shown in FIG. 2 and FIG. 3 should be referred to.

In an example embodiment of the present application, further descriptions on the multiple application relationships between the multiple applications and the multiple permissions as well as a weight corresponding to each application relationship may be obtained with reference to the descriptions on the implementation manner shown in FIG. 3 in the foregoing method embodiment, and are not repeated herein.

In the embodiment of the present application, the weight of the application relationship corresponds to a correlation between the application corresponding to the application relationship and the permission, and generally speaking, the stronger correlation results in a larger magnitude of the weight. Therefore, the weight determining unit 5152 may determine the magnitude of the weight according to the correlation between the application and the weight. In an example embodiment, the weight determining unit 5152 may obtain the correlation by using the magnitude of a probability of the application applying for the permission. It is noted that, in another possible implementation manner, in addition to the probability, the weight determining unit 5152 may further determine the correlation between the application and the permission in another way.

Optionally, in an example embodiment of the present application, the weight determining unit 5152 may further be configured to:

determine the weight corresponding to each application relationship according to a probability of the application corresponding to each application relationship applying for the permission.

In an example embodiment of the present application, the probability may be acquired according to historical data. Therefore, in an example embodiment, the weight determining unit 5152 may further be configured to determine the weight according to permission application historical data of all applications in an application classification to which the application corresponding to each application relationship belongs.

In this example embodiment, the application classification may be a classification divided according to a function of the application, such as game, office, and map; and may further be a classification performed according to a developer of the application, or may be a clustering classification performed according to a similarity in another aspect of the application. It is noted that the application classification may further be a classification performed according to another classification standard.

Figure 6E:
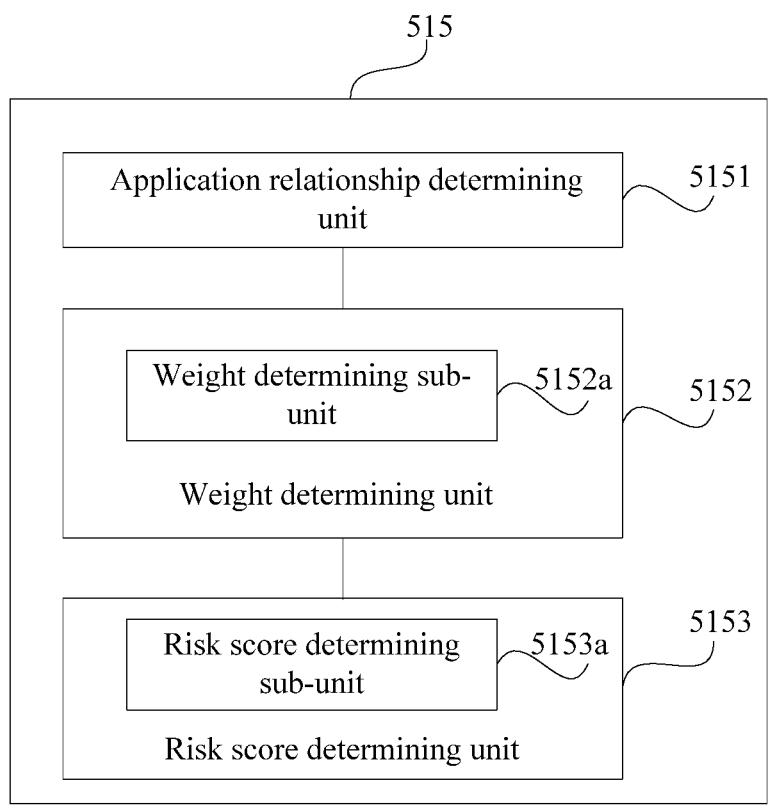

As shown in FIG. 6e, in an example embodiment, to facilitate calculation, the weight determining unit 5152 comprises:

a weight determining sub-unit 5152a, configured to obtain the weight according to a ratio of a frequency of all applications in the application classification applying for the permission to a sum of multiple frequencies of all the applications respectively applying for the multiple permissions. Specifically, the corresponding descriptions in the embodiment shown in FIG. 2 should be referred to.

In an example embodiment of the present application, to obtain a normalized frequency, the frequency corresponding to the permission may be obtained according to a ratio of a frequency of all applications in the application classification applying for the permission to a sum of multiple frequencies of all the applications respectively applying for the multiple permissions. In another example embodiment of the present application, the frequency may be determined in another manner.

To determine the application security risk score of each application faster and more accurately, optionally, in an example embodiment, the risk score determining unit 5153 comprises:

a risk score determining sub-unit 5153a, configured to determine the application security risk score of each application according to the weight corresponding to each application relationship and at least one constraint, wherein the at least one constraint comprises a first constraint, and the first constraint comprises:

the higher a weight corresponding to an application relationship in the multiple application relationships is, the closer an application security risk score of an application corresponding to the application relationship and a permission security risk score of a permission corresponding to the application relationship are.

In the embodiment of the present application, the application security risk score indicates the magnitude of the security risk of the corresponding application, and the permission security risk score indicates the magnitude of the security risk of the corresponding permission.

It is noted that the first constraint considers a primary relationship between the application and the permission. The higher a weight between the application and the permission is, the stronger the correlation between the two is. When one of them has a high risk, the risk of the other is definitely high, and vice versa. Specifically, the corresponding descriptions in the above method embodiment should be referred to.

Optionally, in an example embodiment, the at least one first constraint comprises a second constraint, and the second constraint comprises:

the more similar permission application statuses of two applications in the multiple applications are, the closer application security risk scores of the two applications are.

In this example embodiment, the permission application status comprises: the permission applied for by the application and the weight corresponding to application relationship for the application to apply for the permission. The more similar permissions applied by two applications are, the more similar weights for applying for the same permission at the same time are, and the closer application security risk scores of the two are. Specifically, the corresponding descriptions in the above method embodiment should be referred to.

Optionally, in an example embodiment, an application may be expressed in a vector by using weights of all application relationships corresponding to the application, and in this case, a cosine distance between the two applications may be used to determine the similarity of the two applications. Specifically, the corresponding descriptions in the above method embodiment should be referred to.

It is noted that another method used to indicate the similarity between two vectors may also be used in the embodiment of the present application to determine the similarity of the two applications.

Optionally, in an example embodiment, the at least one first constraint comprises a third constraint, and the third constraint comprises:

for two permissions in the multiple permissions, the more similar applied statuses of the two permissions are, the closer permission security risk scores of the two permissions are.

In the embodiment of the present application, the applied status of the permission comprises an application applying for the permission and a weight of a corresponding application relationship for the application to apply for the permission. The more similar the applications applying for the two permissions are and the more similar the weights of the application relationships for the same application respectively applying for the two permissions are, the closer the permission security risk scores corresponding to the two permissions are.

Likewise, optionally, in an example embodiment, a permission may be expressed in a vector by using weights of all application relationships corresponding to the permission, and in this case, a cosine distance between two permissions may be used to determine the similarity of the two permissions. Specifically, the corresponding descriptions in the above method embodiment should be referred to.

Likewise, it is noted that another method used to indicate the similarity between two vectors may also be used in the embodiment of the present application to determine the similarity of the two permissions.

To cause the obtained application security risk score more accurate, external priori knowledge may be introduced in the calculation of the application security risk score, and therefore, optionally, in an example embodiment, the at least one constraint further comprises a fourth constraint, and the fourth constraint comprises:

application security risk scores of the multiple applications are respectively consistent with priori application security risk scores of the multiple applications; and permission security risk scores of the multiple permissions are respectively consistent with priori permission security risk scores of the multiple permissions.

In the embodiment of the present application, the application security risk scores of the multiple applications and the permission security risk scores of the multiple permissions being respectively consistent with the priori application security risk score and the priori permission security risk score means that the application and permission security risk scores should meet the priori knowledge. For example, under the premise of meeting other constraints, the application security risk score should be as close as possible to the priori application security risk score, and the permission security risk score should be as close as possible to the priori permission security risk score. In the embodiment of the present application, introduction of the fourth constraint may cause the acquired application security risk score to be converged to a suitable range as soon as possible, and for specific description, reference may be made to the corresponding descriptions on the above method embodiment.

In the embodiment of the present application, the priori application security risk score and the priori permission security risk score may respectively obtained in various manners, for example, in some possible implementation manners, a security risk score set by an expert in the art may be used, and a corresponding security risk score may also be obtained by constructing a security classification according to an external risk report, or a security risk score may be obtained by using a security mode that is the most advanced in the related art. Especially, in an example embodiment, the priori application security risk score and the priori permission security risk score may be acquired by using presetting of the user.

In an example embodiment of the present application, in order to cause the corresponding application and permission security risk scores have higher acquisition efficiency, a PNB may be used to obtain the priori application security risk score and the priori permission security risk score.

In an example embodiment of the present application, an application security risk score of each application in the multiple applications may be determined according to the weight corresponding to each application relationship and the first to fourth constraints as described above.

For example, in an example embodiment, an application security risk score of each application may be acquired by using a cost function in the method embodiment in the foregoing.

It is noted that the above cost function is merely one possible manner used in the embodiment of the present application to obtain the application security risk score and the permission security risk score, and the application security risk score and the permission security risk score in the embodiment of the present application may further be obtained by using another formula or function.

Figure 6F:
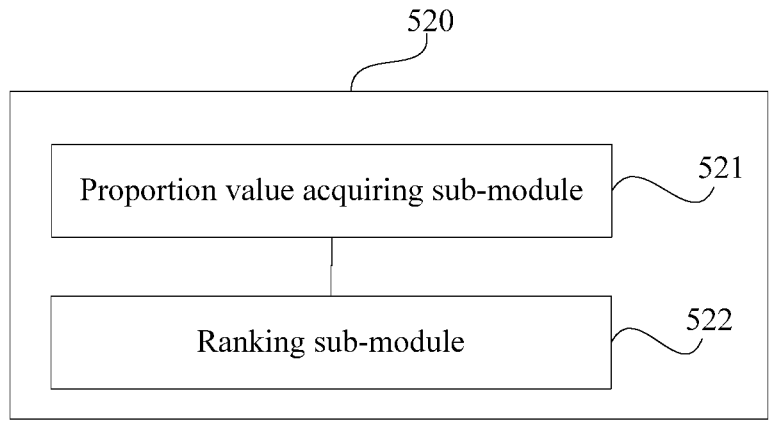
FIG. 6f is a schematic structural block diagram of a ranking module in an application recommendation apparatus according to an example embodiment of the present application.

As shown in FIG. 6f, in an example embodiment of the present application, the ranking module 520 comprises:

a proportion value acquiring sub-module 521, configured to acquire multiple recommendation proportion values respectively corresponding to the multiple applications, wherein a total popularity value of the multiple applications obtained according to the popularity values and the multiple recommendation proportion values and a total security risk value of the multiple applications obtained according to the security risk values and the multiple recommendation proportion values meet at least one set standard; and a ranking sub-module 522, configured to rank the multiple applications according to the multiple recommendation proportion values.

In the embodiment of the present application, the proportion value acquiring sub-module 521 obtains the multiple recommendation proportion values corresponding to the multiple applications, to cause the total popularity value and the total security risk value of the multiple applications meet the set standard.

Figure 6G:
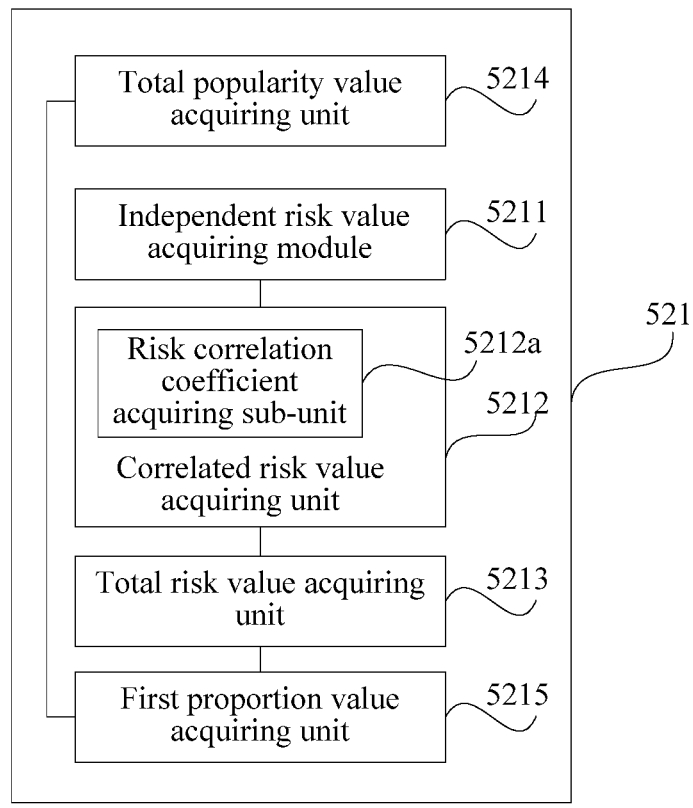
FIG. 6g to FIG. 6j are schematic structural block diagrams of a proportion value acquiring sub-module in four application recommendation apparatuses according to an example embodiment of the present application.

As shown in FIG. 6g, in an example embodiment of the present application, the proportion value acquiring sub-module 521 comprises:

a total popularity value acquiring unit 5214, configured to acquire the total popularity value of the multiple applications in the following manner:

obtaining a single popularity value of each application according to a product of a recommendation proportion of each application and the popularity value, and obtaining the total popularity value by summarizing the single popularity values of the multiple applications. Specifically, the corresponding descriptions in the method embodiment shown in FIG. 4 should be referred to.

In an example embodiment, the proportion value acquiring sub-module 521 may comprise:

an independent risk value acquiring module 5211, configured to obtain an independent security risk value of each application according to the recommendation proportion value and the security risk value corresponding to each application;

a correlated risk value acquiring unit 5212, configured to obtain a correlated security risk value of each application according to the recommendation proportion value and the security risk value corresponding to each application, and a risk correlation coefficient between each application and each other application in the multiple applications; and A total risk value acquiring unit 5213, configured to obtain the total security risk value according to the independent security risk value and the correlated security risk value of each application.

In an example embodiment, a single security risk value of an application in the multiple applications is a sum of an independent security risk value and a correlated security risk value of the application. The total security risk value of the multiple applications is a sum of single security risk values of the multiple applications. Specifically, the corresponding descriptions in the embodiment shown in FIG. 4 should be referred to.

In an example embodiment of the present application, the correlated risk value acquiring unit 5212 comprises:

a risk correlation coefficient acquiring sub-unit 5212a, configured to obtain a risk correlation coefficient between each application and one application in other applications according to a number of all permissions applied by each application, a number of all permissions applied by the application in the other applications, and a number of all permissions applied jointly by each application and the application in the other applications. Specifically, the corresponding descriptions in the embodiment shown in FIG. 4 should be referred to.

Optionally, in an example embodiment of the present application, the proportion value acquiring sub-module 521 comprises:

a first proportion value acquiring unit 5215, configured to acquire the multiple recommendation proportion values enabling a maximum difference between the total popularity value and the total security risk value.

Figure 6H:
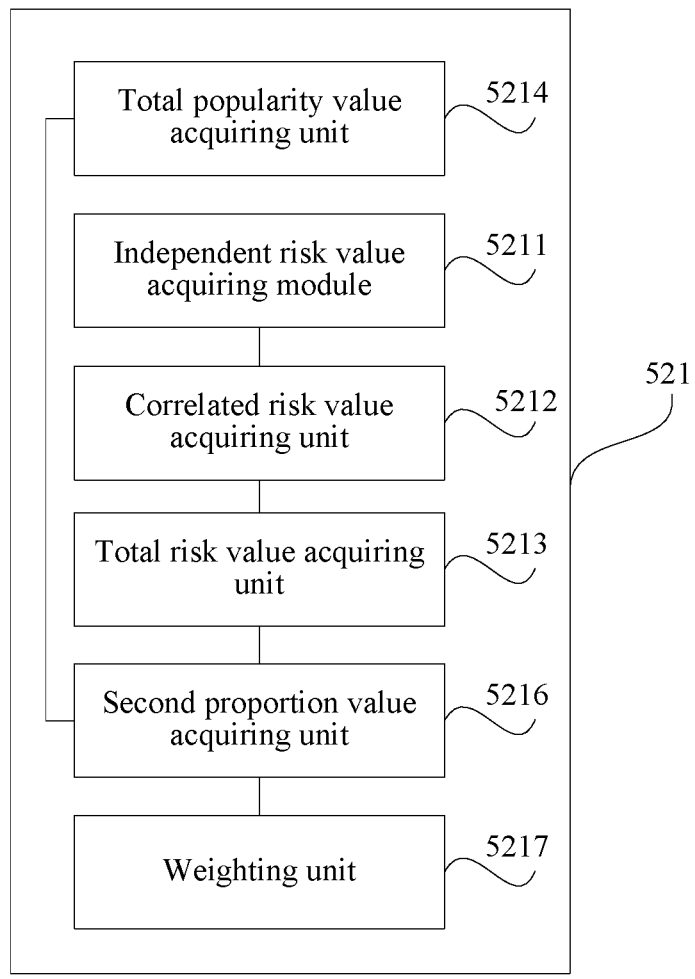

In consideration that different users may have different risk tolerance preferences, for example, some users pay attention to security risks of applications and have small tolerance; while some users pay less attention to security risks of applications and have large tolerance. Therefore, as shown in FIG. 6h, in another possible implementation manner of the embodiment of the present application, the proportion value acquiring sub-module 521 comprises:

a second proportion value acquiring unit 5216, configured to acquire the multiple recommendation proportion values enabling a maximum difference between the total popularity value and a weighted total security risk value of the multiple applications; and a weighting unit 5217, configured to obtain the weighted total security risk value of the multiple applications according to a user risk tolerance preference and the total security risk value.

For example, in an example embodiment, the weighting unit 5217 is configured to obtain a weighted total security risk value of the multiple applications according to the total security risk value multiplied by a risk preference coefficient. In an example embodiment, the risk preference coefficient is correlated to a level of risk tolerance selected by the user.

Figure 6I:
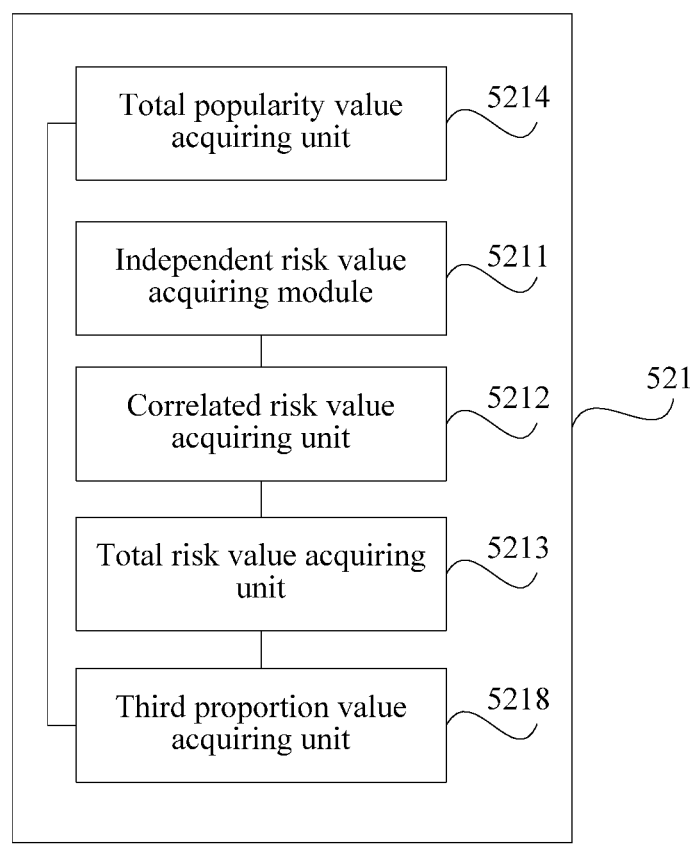

Optionally, as shown in FIG. 6i, in still another possible implementation manner of the embodiment of the present application, the proportion value acquiring sub-module 521 comprises:

a third proportion value acquiring unit 5218, configured to obtain the multiple recommendation proportion values enabling the total security risk value meeting a set maximum risk standard and enabling the maximum total popularity value.

In this example embodiment, it is unnecessary that the total security risk value is the minimum, and as long as the total security risk value meets the maximum risk standard, in this case, the higher total popularity of the multiple applications is the better. The maximum risk standard may be a fixed value, and may also be set according to a preference of the user.

Figure 6J:
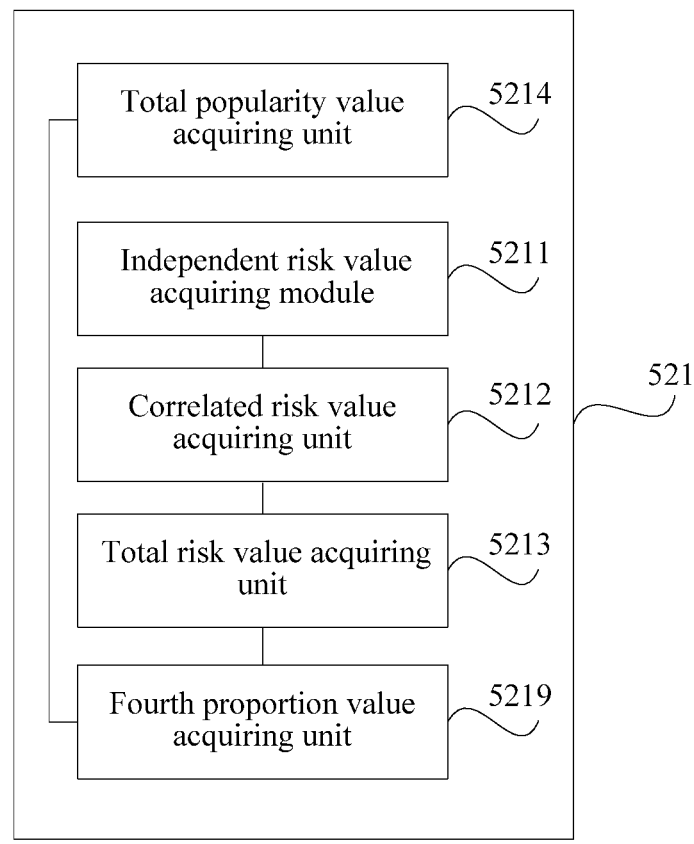

Optionally, as shown in FIG. 6j, in still another possible implementation manner of the embodiment of the present application, the proportion value acquiring sub-module 521 comprises:

a fourth proportion value acquiring unit 5219, configured to obtain the multiple recommendation proportion values enabling the total popularity value meeting a set minimum popularity standard and enabling the minimum total security risk value.

In this example embodiment, it is unnecessary that the total popularity value of the application is the maximum, as long as the total popularity value meets the minimum popularity standard, and in this case, the lower total security risk of the multiple applications is the better. The maximum risk standard may be a fixed value, and may also be set according to a preference of the user.

Figure 6K:
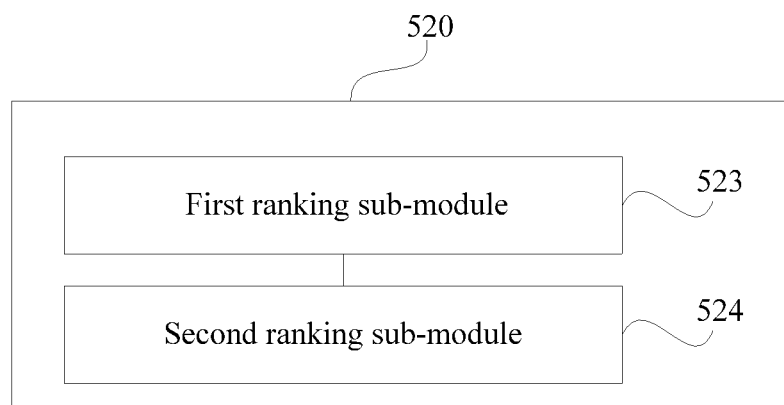
FIG. 6k and FIG. 6l are schematic structural block diagrams of a ranking module in other two application recommendation apparatus according to an example embodiment of the present application.

As shown in FIG. 6k, optionally, in another possible implementation manner of the embodiment of the present application, the ranking module 520 comprises:

a first ranking sub-module 523, configured to perform first ranking on the multiple applications according to the popularity value of each application; and a second ranking sub-module 524, configured to: in a case that at least two applications in the multiple applications have the same popularity value, perform second ranking on the at least two applications according to the security risk values of the at least two applications.

In this example embodiment, the ranking module 520 uses the first ranking sub-module 523 to perform overall ranking on the multiple applications according to the popularity values, wherein, when there are applications having the same popularity value, for example, when there are three applications have the same popularity value, the second ranking sub-module 524 is used to perform local ranking on the three applications according to security risk values of the three applications.

Figure 6L:
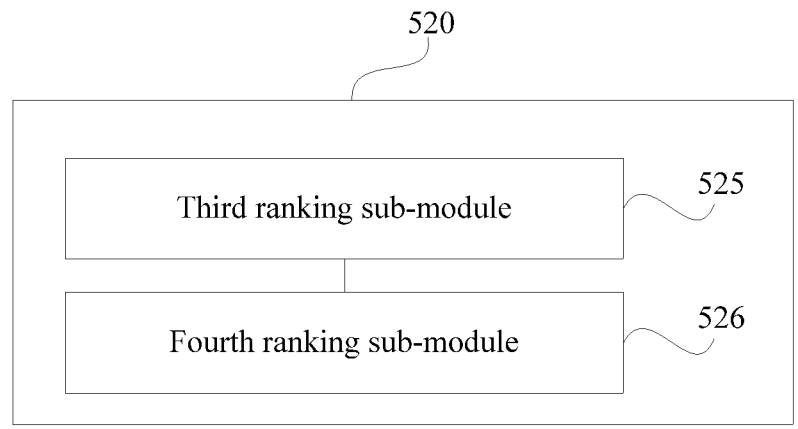

As shown in FIG. 6l, optionally, in another example embodiment of the embodiment of the present application, the ranking module 520 comprises:

a third ranking sub-module 525, configured to perform first ranking on the multiple applications according to the security risk value of each application; and a fourth ranking sub-module 526, configured to: in a case that at least two applications in the multiple applications have the same security risk value, perform second ranking on the at least two applications according to the popularity values of the at least two applications.

In the embodiment of the present application, the ranking module 520 uses the third ranking sub-module 525 to perform overall ranking on all applications according to security risk values of the applications, and when there are two or more applications have the same security risk value, further uses the fourth ranking sub-module 526 to perform local ranking on the two or more applications according to popularities of the two or more applications.

It is noted that, when the ranking modules 520 shown in FIG. 6k and FIG. 6l are used to rank the multiple applications, a popularity value of each application may be the popularity information as described above, for example, the number of downloads of the application; and a security risk value of each application may be the security risk information as described above, for example, the application security risk score.

In an example embodiment, the apparatus as described in the embodiment of the present application may be applied to an application distribution platform end, and configured to rank multiple applications according to security risk values and popularity values of the multiple applications of the application distribution platform, thereby performing recommendation of applications to the user based on the popularity and the security risk.

In another example embodiment, the apparatus as described in the embodiment of the present application may be applied to a user equipment end, and configured to rank multiple applications according to security risk values and popularity values of the multiple applications of the user equipment, thereby helping the user to determine a suitable application.

In an example embodiment, the multiple applications are mobile applications applied to a mobile user equipment (such as a mobile phone and a tablet computer), and the application distribution platform is an application market, for example, an Android application market such as Google Play, and an App Store application market of Apple.

Figure 7:
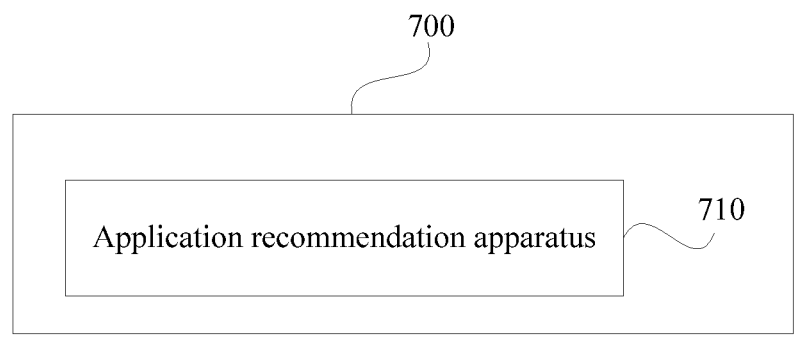
FIG. 7 is a schematic structural block diagram of an electronic device according to an example embodiment of the present application.

As shown in FIG. 7, an electronic device 700 is provided in an example embodiment of the present application, which comprises the application recommendation apparatus 710 as described above.

In an example embodiment, the electronic device 700 may be a user equipment, and optionally, may be a mobile user equipment. In another possible implementation manner, the electronic device 700 may further be a server.

Figure 8:
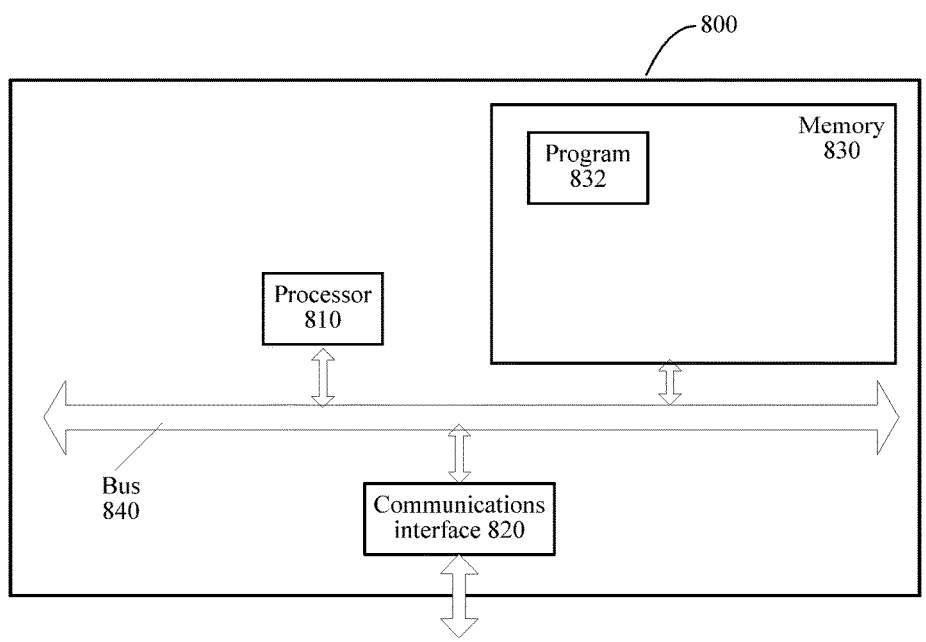
FIG. 8 is a schematic structural block diagram of another application recommendation apparatus according to an example embodiment of the present application.

FIG. 8 is a schematic structural diagram of another application recommendation apparatus 800 provided in an embodiment of the present application, and the specific implementation of the application recommendation apparatus 800 is not limited in the specific implementation of the present application. As shown in FIG. 8, the application recommendation apparatus 800 may comprise:

A processor 810, a communications interface 820, a memory 830, and a communications bus 840, where:

The processor 810, the communications interface 820, and the memory 830 complete mutual communications with each other through the communications bus 840.

The communications interface 820 is configured to communicate with a network element such as a client.

The processor 810 is configured to execute a program 832, and may specifically execute relevant steps in the above method embodiment.

Specifically, the program 832 may comprise a program code. The program code comprises a computer operating instruction.

The processor 810 may be a central processing unit CPU or an Application Specific Integrated Circuit (ASIC), or be configured to be one or more integrated circuits configured to implement the embodiments of the present application.

The memory 830 is configured to store the program 832. The memory 830 may comprise a high-speed RAM memory and may also further comprise a non-volatile memory, for example, at least one magnetic disk memory. The program 832 may specifically used to cause the application recommendation apparatus 800 to execute the following steps:

acquiring a popularity value and a security risk value of each application in multiple applications; and ranking the multiple applications according to the popularity value and the security risk value.

Implementations of all steps in the program 832 may be referred to in the corresponding descriptions of the corresponding steps or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

Persons of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. Persons skilled in the art can use different methods to implement the described functions for every specific application, but it should not be considered that this implementation goes beyond the scope of the present application.

When being implemented in the form of a software functional unit and sold or used as a separate product, the functions may be stored in a computer-readable storage medium. Based on such understanding, the technical solutions of the present invention essentially, or the part contributing to the prior art, or part of the technical solutions may be implemented in a form of a software product. The computer software product is stored in a storage medium, and comprises several instructions for instructing a computer device (which may be a personal computer, a server, a network device, and the like) to execute all or part of the steps of the method described in each of the embodiments of the present application. The aforementioned storage medium comprises: any medium that can store program codes, such as a USB disk, a removable hard disk, a read-only memory (ROM), a random access memory (RAM), a magnetic disk, or an optical disc.

The aforementioned description of the example embodiments are merely provided for describing the present application, but not intended to limit the present application. Persons of ordinary skills in the art can also make many variations and changes without departing from the spirit and the scope of the present application. Therefore, all the equivalent technical solutions also fall within the scope of the present application, and the patent protection scope of the present application shall be limited by the claims.

What is claimed is:

1. A method, comprising:

acquiring, by a system comprising a processor, a popularity value and a security risk value of each application in multiple applications; and ranking the multiple applications according to the popularity value and the security risk value of each application, wherein the ranking the multiple applications according to the popularity value and the security risk value of each application comprises:

acquiring multiple recommendation proportion values respectively corresponding to the multiple applications such that a total popularity value of the multiple applications and a total security risk value of the multiple applications satisfy at least one set standard, wherein the total popularity value of the multiple applications is obtained according to the popularity values and the multiple recommendation proportion values, and the total security risk value of the multiple applications is obtained according to the security risk values and the multiple recommendation proportion values; and ranking the multiple applications according to the multiple recommendation proportion values, wherein obtaining the total security risk value according to the security risk value and the multiple recommendation proportion values comprises:

obtaining an independent security risk value of each application of the multiple applications according to a recommendation proportion value and a security risk value corresponding to each application;

obtaining a correlated security risk value of each application according to the recommendation proportion value and the security risk value corresponding to each application, and a risk correlation coefficient between each application and each other application of the multiple applications; and obtaining the total security risk value according to the independent security risk value and the correlated security risk value of each application.

2. The method of claim 1, wherein the total popularity value and the total security risk value being determined to satisfy the at least one set standard comprises:
a difference between the total popularity value and the total security risk value being determined to be a maximum.

3. The method of claim 1, further comprising:
obtaining a weighted total security risk value of the multiple applications according to a user risk tolerance preference and the total security risk value,
wherein the total popularity value and the total security risk value being determined to satisfy the at least one set standard comprises:
a difference between the total popularity value and the weighted total security risk value determined to be a maximum.

4. The method of claim 1, wherein the total popularity value and the total security risk value being determined to satisfy the at least one set standard comprises:
the total security risk value being determined to satisfy a set maximum risk standard, and the total popularity value being determined to be a maximum.

5. The method of claim 1, wherein the total popularity value and the total security risk value being determined to satisfy the at least one set standard comprises:
the total popularity value being determined to satisfy a set minimum popularity standard, and the total security risk value being determined to be a minimum.

6. The method of claim 1, further comprising:
obtaining the risk correlation coefficient between each application and an application in the other applications according to a number of all permissions applied by each application, a number of all permissions applied by the application in the other applications, and a number of all permissions applied jointly by each application and the application in the other applications.

7. The method of claim 1, wherein the acquiring the popularity value of each application in the multiple applications comprises:
acquiring popularity information of each application; and
acquiring the popularity value of each application according to the popularity information of each application.

8. The method of claim 1, wherein the acquiring the security risk value of each application in the multiple applications comprises:
acquiring security risk information of each application; and
acquiring the security risk value of each application according to the security risk information of each application.

9. The method of claim 1, wherein the acquiring the security risk value of each application in the multiple applications comprises:
acquiring an application security risk score of each application; and
acquiring the security risk value of each application according to the security risk score of each application.

10. The method of claim 9, wherein the acquiring the application security risk score of each application comprises:
determining multiple applications relationships between the multiple applications and multiple permissions, wherein each application relationship in the multiple applications relationships corresponds to one permission in the multiple permissions applied by one application in the multiple applications;
determining a weight corresponding to each application relationship in the multiple application relationships; and
determining the application security risk score of each application in the multiple applications according to the weight corresponding to each application relationship.

11. The method of claim 10, wherein the weight corresponding to each application relationship is determined according to a probability of the application corresponding to each application relationship applying for the permission.

12. The method of claim 11, wherein the weight corresponding to each application relationship is determined according to permission application historical data of all applications in an application classification to which the application corresponding to each application relationship belongs.

13. The method of claim 12, wherein the weight corresponding to each application relationship is obtained according to a ratio of a frequency of all applications in the application classification applying for the permission to a sum of multiple frequencies of all the applications respectively applying for the multiple permissions.

14. The method of claim 10, wherein the determining the application security risk score of each application in the multiple applications according to the weight corresponding to each application relationship comprises:
determining the application security risk score of each application according to the weight corresponding to each application relationship and at least one constraint,
wherein the at least one constraint comprises a first constraint, and the first constraint comprises for which:
the higher a weight corresponding to an application relationship in the multiple application relationships is, the closer an application security risk score of an application corresponding to the application relationship and a permission security risk score of a permission corresponding to the application relationship are.

15. The method of claim 14, wherein the at least one constraint further comprises a second constraint, and the second constraint comprises for which:
the more similar permission application statuses of two applications in the multiple applications are, the closer application security risk scores of the two applications are.

16. The method of claim 14, wherein the at least one constraint further comprises a second constraint, and the second constraint comprises for which:
for two permissions in the multiple permissions, the more similar applied statuses of the two permissions are, the closer permission security risk scores of the two permissions are.

17. The method of claim 14, wherein the at least one constraint further comprises a second constraint, and the second constraint comprises for which:
application security risk scores of the multiple applications are respectively consistent with prior application security risk scores of the multiple applications; and
permission security risk scores of the multiple permissions are respectively consistent with prior permission security risk scores of the multiple permissions.

18. The method of claim 1, wherein the ranking the multiple applications according to the popularity value and the security risk value comprises:
performing first ranking on the multiple applications according to the popularity value of each application,
wherein, in a case that at least two applications in the multiple applications have a same popularity value, second ranking is performed on the at least two applications according to the security risk values of the at least two applications.

19. The method of claim 1, wherein the ranking the multiple applications according to the popularity value and the security risk value comprises:
performing first ranking on the multiple applications according to the security risk value of each application,
wherein, in a case that at least two applications in the multiple applications have a same security risk value, second ranking is performed on the at least two applications according to the popularity values of the at least two applications.

20. An apparatus, comprising:
a memory that stores executable modules; and
a processor, couple to the memory, that executes or facilitates execution of the executable modules, the executable modules comprising:
an acquiring module configured to acquire respective popularity values and respective security risk values of respective applications; and
a ranking module configured to rank the respective applications according to the respective popularity values and the respective security risk values,
wherein the ranking module comprises:
a proportion value acquiring sub-module configured to acquire respective recommendation proportion values corresponding to the respective applications such that a total popularity value of the respective applications and a total security risk value of the respective applications meet a set standard, wherein the total popularity value of the respective applications is obtained according to the respective popularity values and the respective recommendation proportion values, and the total security risk value of the respective applications is obtained according to the respective security risk values and the respective recommendation proportion values; and
a ranking sub-module configured to rank the respective applications according to the respective recommendation proportion values,
wherein the proportion value acquiring sub-module comprises:
an independent risk value acquiring unit configured to obtain independent security risk values of the respective applications according to the respective recommendation proportion values and the respective security risk values corresponding to the respective applications;
a correlated risk value acquiring unit configured to obtain respective correlated security risk values of the respective applications according to the respective recommendation proportion values and the respective security risk values corresponding to the respective applications, and risk correlation coefficients between each of the respective applications and each other application in the respective applications; and
a total risk value acquiring unit configured to obtain the total security risk value according to the independent security risk values and the respective correlated security risk values of the respective applications.

21. The apparatus of claim 20, wherein the proportion value acquiring sub-module comprises:
a first proportion value acquiring unit configured to acquire the respective recommendation proportion values enabling a maximum difference between the total popularity value and the total security risk value.

22. The apparatus of claim 20, wherein the proportion value acquiring sub-module comprises:
a first proportion value acquiring unit configured to acquire the respective recommendation proportion values enabling a maximum difference between the total popularity value and a weighted total security risk value of the respective applications; and
a weighting unit configured to obtain the weighted total security risk value of the respective applications according to a user risk tolerance preference and the total security risk value.

23. The apparatus of claim 20, wherein the proportion value acquiring sub-module comprises:
a first proportion value acquiring unit configured to obtain the respective recommendation proportion values enabling the total security risk value to meet a set maximum risk standard and enabling a maximum total popularity value.

24. The apparatus of claim 20, wherein the proportion value acquiring sub-module comprises:
a first proportion value acquiring unit configured to obtain the respective recommendation proportion values enabling the total popularity value to meet a set minimum popularity standard and enabling a minimum total security risk value.

25. The apparatus of claim 20, wherein the correlated risk value acquiring unit comprises:
a risk correlation coefficient acquiring sub-unit configured to obtain respective risk correlation coefficients between each of the respective applications and one application in other applications according to a number of permissions applied by the respective applications, a number of permissions applied by the one application in the other applications, and a number of permissions applied jointly by each of the respective applications and the one application in the other applications.

26. The apparatus of claim 20, wherein the acquiring module comprises:
a popularity information acquiring sub-module configured to acquire respective popularity information of the respective applications; and
a popularity value acquiring sub-module configured to obtain the respective popularity values of the respective applications according to the respective popularity information of the respective applications.

27. The apparatus of claim 20, wherein the acquiring module comprises:
a risk information acquiring sub-module configured to acquire respective security risk information of the respective applications; and
a risk value acquiring sub-module configured to obtain the respective security risk values of the respective applications according to the respective security risk information of the respective applications.

28. The apparatus of claim 20, wherein the acquiring module comprises:

a risk score acquiring sub-module configured to acquire respective application security risk scores of the respective application; and a risk value acquiring sub-module configured to obtain the respective security risk values of the respective applications according to the respective security risk scores of the respective applications.

29. The apparatus of claim 28, wherein the risk score acquiring sub-module comprises:

an application relationship determining unit configured to determine respective applications relationships between the respective applications and respective permissions, wherein each application relationship in the respective applications relationships is corresponding to one permission in the respective permissions applied by one application in the respective applications;

a weight determining unit configured to determine respective weights corresponding to each application relationship in the respective application relationships; and a risk score determining unit configured to determine the respective application security risk scores of the respective applications according to the respective weights corresponding to each application relationship.

30. The apparatus of claim 29, wherein the weight determining unit is further configured to:

determine the respective weights corresponding to each application relationship according to the respective probabilities of the respective applications corresponding to each application relationship applying for the permission.

31. The apparatus of claim 30, wherein the weight determining unit comprises:

a weight determining sub-unit configured to obtain the respective weights according to a ratio of a frequency of all applications in the application classification applying for the permission to a sum of respective frequencies of all the respective applications respectively applying for the respective permissions.

32. The apparatus of claim 29, wherein the risk score determining unit comprises:

a risk score determining sub-unit configured to determine the respective application security risk scores of the respective applications according to the respective weights corresponding to each application relationship and at least one constraint, wherein the at least one constraint comprises a first constraint, and the first constraint comprises:

the higher a weight corresponding to an application relationship in the respective application relationships is, the closer an application security risk score of an application corresponding to the application relationship and a permission security risk score of a permission corresponding to the application relationship are.

33. The apparatus of claim 32, wherein the at least one constraint further comprises a second constraint, and the second constraint comprises:

the more similar permission application statuses of two applications in the respective applications are, the closer application security risk scores of the two applications are.

34. The apparatus of claim 32, wherein the at least one constraint further comprises a second constraint, and the second constraint comprises:

for two permissions in the respective permissions, the more similar applied statuses of the two permissions are, the closer permission security risk scores of the two permissions are.

35. The apparatus of claim 32, wherein the at least one constraint further comprises a second constraint, and the second constraint comprises:

application security risk scores of the respective applications are respectively consistent with prior application security risk scores of the respective applications; and permission security risk scores of the respective permissions are respectively consistent with prior permission security risk scores of the respective permissions.

36. The apparatus of claim 20, wherein the ranking module comprises:

a first ranking sub-module configured to perform first ranking on the respective applications according to the respective popularity values of the respective applications; and a second ranking sub-module configured to: in a case that at least two applications in the respective applications have a same popularity value, perform second ranking on the at least two applications according to security risk values of the at least two applications.

37. The apparatus of claim 20, wherein the ranking module comprises:

a first ranking sub-module configured to perform first ranking on the respective applications according to the respective security risk values of the respective applications; and a second ranking sub-module configured to: in a case that at least two applications in the respective applications have a same security risk value, perform second ranking on the at least two applications according to popularity values of the at least two applications.

38. The apparatus of claim 20, wherein the apparatus is an electronic device, and wherein the electronic device comprises one of a user equipment, a mobile user equipment, or a server.

39. A computer readable storage device comprising executable instructions that, in response to execution, cause a device comprising a processor to perform operations, comprising:

acquiring respective popularity values and respective security risk values of multiple applications; and ranking the multiple applications according to the respective popularity values and the respective security risk values, wherein the ranking the multiple applications according to the respective popularity values and the respective security risk values comprises:

acquiring multiple recommendation proportion values respectively corresponding to the multiple applications such that a total popularity value of the multiple applications and a total security risk value of the multiple applications satisfy at least one set standard, wherein the total popularity value of the multiple applications is obtained according to the respective popularity values and the multiple recommendation proportion values, and the total security risk value of the multiple applications is obtained according to the respective security risk values and the multiple recommendation proportion values; and ranking the multiple applications according to the multiple recommendation proportion values, wherein obtaining the total security risk value according to the respective security risk values and the multiple recommendation proportion values comprises:
  obtaining respective independent security risk values of the multiple applications according to the respective ones of the multiple recommendation proportion values and the respective security risk values;
  obtaining respective correlated security risk values of the multiple applications according to the respective ones of the multiple recommendation proportion values and the respective security risk values, and respective risk correlation coefficients between each application of the multiple applications and each other application of the multiple applications; and
  obtaining the total security risk value according to the respective independent security risk values and the respective correlated security risk values.

40. The computer readable storage device of claim 39, wherein the total popularity values and the total security risk values being determined to satisfy the at least one set standard comprise:
  a difference between the total popularity values and the total security risk values being determined to be a maximum.

41. The computer readable storage device of claim 39, the operations further comprising:
  obtaining a weighted total security risk value of the multiple applications according to a user risk tolerance preference and the total security risk values, wherein the total popularity values and the total security risk values being determined to satisfy the at least one set standard comprise:
    a difference between the total popularity values and the weighted total security risk value determined to be a maximum.

42. The computer readable storage device of claim 39, wherein the total popularity value and the total security risk value being determined to satisfy the at least one set standard comprise:
  the total security risk value being determined to satisfy a set maximum risk standard, and the total popularity value being determined to be a maximum.

43. The computer readable storage device of claim 39, wherein the total popularity value and the total security risk value being determined to satisfy the at least one set standard comprise:
  the total popularity value being determined to satisfy a set minimum popularity standard, and the total security risk value being determined to be a minimum.

44. The computer readable storage device of claim 39, the operations further comprising:
  obtaining respective risk correlation coefficients between each application and an application in the other applications according to a first number of permissions applied by each application, a second number of permissions applied by the application in the other applications, and a third number of permissions applied jointly by each application and the application in the other applications.

* * * * *